Apr. 17, 1923.
W. J. RUFF
LIVE BAIT BUCKET
Filed Aug. 17, 1922
1,451,925
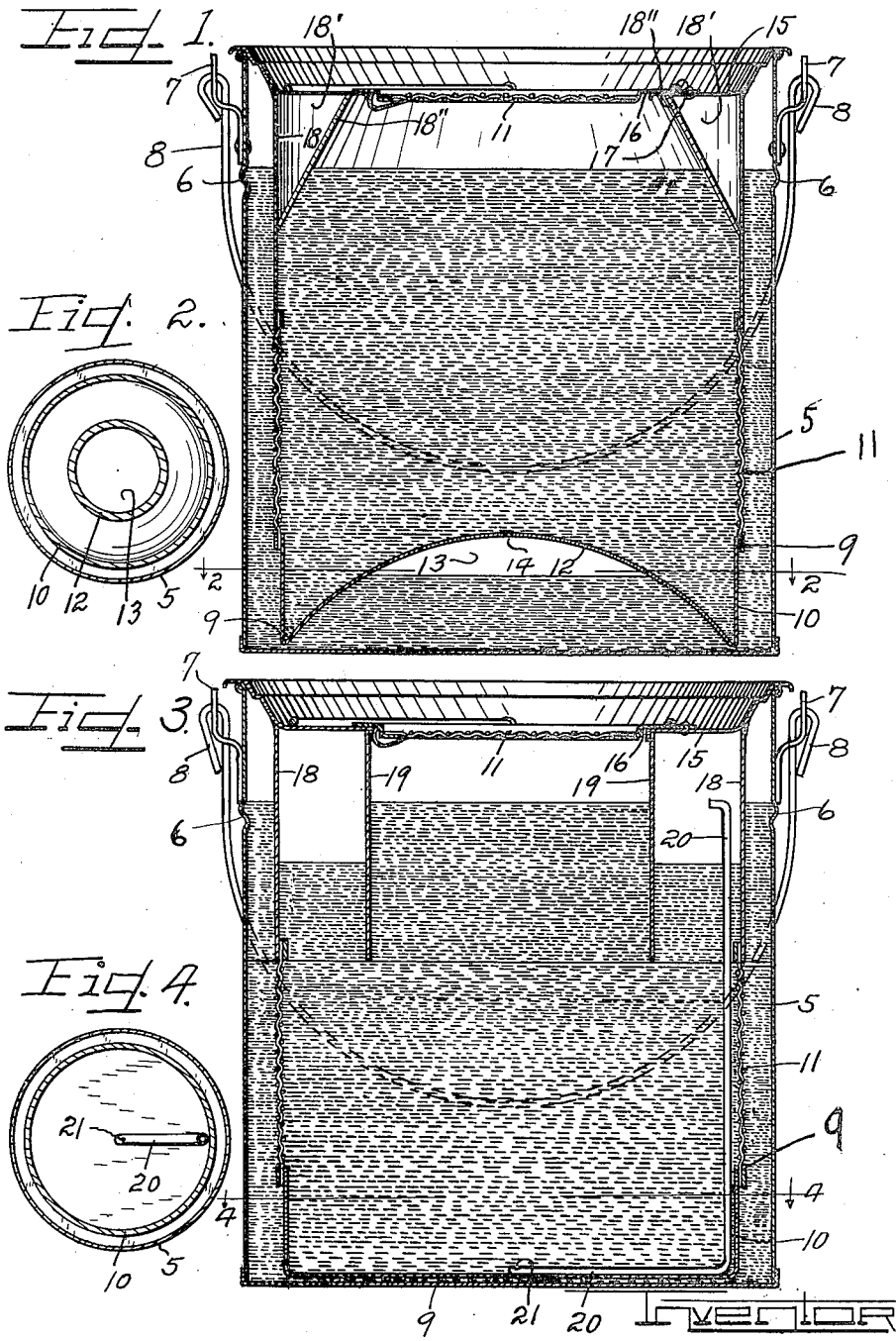

Patented Apr. 17, 1923.

1,451,925

UNITED STATES PATENT OFFICE.

WILLIAM J. RUFF, OF QUINCY, ILLINOIS.

LIVE-BAIT BUCKET.

Application filed August 17, 1922. Serial No. 582,532.

*To all whom it may concern:*

Be it known that I, WILLIAM J. RUFF, a citizen of the United States, residing at Quincy, in the county of Adams and the State of Illinois, have invented certain new and useful Improvements in Live-Bait Buckets, of which the following is a specification.

My invention relates to buckets for holding live fish bait and the like and has for one of its objects the provision of a simple and efficient device of this character adapted to aerate water contained therein so as to keep bait alive for a considerable time.

A further object of the invention is the provision of a float open to pressure of water in the bait bucket and so that such pressure facilitates forcing air out of the float into said water.

Other objects will appear hereinafter.

An embodiment of my invention is illustrated in the accompanying drawing, forming a part of this specification and in which—

Figure 1 is a vertical section of a fish bait bucket embodying my invention;

Fig. 2 is a section taken on line 2—2 of Fig. 1 but on a smaller scale;

Fig. 3 is a view similar to Fig. 1 but showing a different form of float; and

Fig. 4 is a section taken on line 4—4 of Fig. 3 but on a smaller scale.

Referring more particularly to the drawing, I have indicated a bucket or liquid container 5 which may be of any approved construction and of any approved material. The bucket 5 may be made of tin, galvanized iron or any other suitable material. I preferably provide a bead 6 in the bucket 5 to indicate the proper water level of such bucket. The bucket 5 may be provided with ears 7 to which a bail 8 is attached or such bail may be attached in any desired manner and have any desired form.

Disposed within the bucket I provide a vessel 9 which may have portions thereof of wire screen or other foraminous material so that the water can pass freely from the interior of vessel 9 to the outside of the latter in bucket 5. In the present instance I have indicated a portion 10 at the bottom of vessel 9 of imperforate material such as sheet metal. This arrangement provides means for maintaining the live bait in water when the vessel 9 is raised up out of the water so as to remove bait therefrom. It will be obvious that the wire screen 11 indicated just above the top of part 10 may extend as far down as desired. In the construction of Figs. 1 and 2 the bottom 12 of vessel 9 is curved upwardly so as to provide a pocket 13. This upward curve of bottom 12 forms a float by imprisoning air in the pocket 13. The weight of the vessel 9 will tend to compress the air in pocket 13 and in order to force such air up through the liquid in bucket 5 and vessel 9, I provide a very small opening 14 in the wall 12 in some such position as indicated in Fig. 1. This causes the air imprisoned in pocket 13 to bubble up through the water in vessel 9, thereby aerating the latter, and such aeration of the water will greatly increase the life of the bait housed in said bucket. This bubbling of the air up through the water tends to carry particles of the water along with the air when it leaves the water, which facilitates evaporation of the particles of water carried away from the surface of the water when the air leaves the latter. The wall 12 may have any configuration. An important feature of it is to provide the pocket 13 so as to imprison a quantity of air at the bottom of the vessel 9 to provide a float and means for forcing the air in small bubbles up through the water At the top of vessel 9 I provide a cover 15 which has its periphery resting on the top or rim of the bucket 5. In the present instance this top 15 is cut downwardly and provided with a door 16 hinged as at 17 so that access may be easily had to the interior of vessel 9. The door 16 is also provided with wire screening or other material 11 so as to admit air to the interior of vessel 9. I have indicated a solid wall 18 above the screen 11 in the upright wall of vessel 9 and it will be apparent that this solid material 18 and wire screen 11 may be varied as to their heights to suit different requirements.

In Figs. 3 and 4 I have indicated the float as being mounted at the top of vessel 9. In this instance a cylindrical wall 19 is concentric and disposed within wall 18. The cover 15 provides a top for the chamber between walls 18 and 19. The bottom of the chamber between walls 18 and 19 is open so that water can pass up into such chamber when the air is removed therefrom. The depth of the walls 18 and 19 may be varied as desired. The lid 16 is provided so as to obtain access to the interior of chamber 9 through the space within wall 19.

Attached to the inside of vessel 9 is a pipe 20 having its upper end disposed at substantially the water level of bucket 5 and its lower end disposed on the bottom of said vessel 9. The bottom end of pipe 20 is sealed but for a very small opening 21 which permits air to pass from the chamber between walls 18 and 19 down through the pipe and bubble up through the liquid from said opening 21. The opening 21 may be arranged any where in the pipe 20 under the surface of the water but I find it is advantageous to provide it somewhere in the bottom of the vessel 9 near the center thereof so as to make the air have a maximum aerating effect on the water. It will be apparent that more than one of the openings 14 and 21 may be provided when desired.

The vessel 9 of either of the constructions indicated may be taken out of bucket 5 and placed in any other water in which it is desired to maintain live bait. In the case of the construction of Fig. 1 it is sometimes desirable to place a weight on vessel 9 when placed in a lake or other large body of water due to the air imprisoned in pocket 13. The construction of Fig. 1 is indicated as having an annular space of trapped air 18' formed between a part of top 15, wall 18, and a flaring wall 18''. The air space 18' is particularly adaptable for maintaining the vessel 9 in upright position when the latter is placed in a body of water larger than the bucket 5, as referred to above. The air space 18' of construction of Fig. 1 is provided in many of the live bait buckets now in use and when desirable my improved aerating mechanism enclosing a pocket 13 and air vent 14 may be attached to such live bait buckets.

In the construction shown in Fig. 3 the intake opening of tube 20 is sufficiently low to insure maintaining a quantity of air in the annular space between walls 18 and 19 so as to maintain the vessel 9 in upright condition when placed in a large body of water.

I claim:

1. A bait bucket comprising a liquid container, and a float open at its bottom in the container, said float having a small air vent below the liquid level of the liquid container.

2. A bait bucket comprising a liquid container, a float open at its bottom in the container, said float having a small air vent below the liquid level of the liquid container, and a bait cage attached to the float adapted to exert a downward pull on said float.

3. A bait bucket comprising a liquid container, and a float open at its bottom in the container, said float having a small air vent therein adjacent the bottom of said bucket.

4. A bait bucket comprising a liquid container, a float open at one side in said container, and means holding said float with its open side down, there being a small air vent opening below the liquid level in the container and connected with the interior of said float.

5. A bait bucket comprising a liquid container; a bait cage disposed within said container and extending to adjacent the bottom of the latter, and a float attached to the bait cage, there being an air vent in said float opening adjacent the bottom of the bait cage.

6. A bait bucket comprising a liquid container; a bait cage in said container, a float mounted at the bottom of said bait cage with an air vent in its top side and with its bottom side open.

7. A bait bucket comprising a liquid container; a float disposed within said container having its bottom side open; and means enclosing an air passage from the interior of said float to the bottom of said container, there being an air vent in the bottom of said means.

8. A bait bucket comprising a liquid container; a float in the container and having its bottom side open; a bait cage attached to the float and disposed under the latter; and a pipe having one end opening into the interior of said float and its other end having an air vent adjacent the bottom of said container.

9. A bait bucket comprising a liquid container; a float disposed within the container and having its bottom side open; means in the container for indicating the proper water level thereof, the bottom edge of the float being below said water level indicating means, and a pipe extending downwardly from the interior of the float to adjacent the bottom of said container.

10. A bait bucket comprising a liquid container; a float disposed within said container; a bait cage attached to the bottom of the float; means in the container for indicating the proper water level thereof, and a pipe attached to the float and having its upper end approximately at the water level of the container when the float is in its lowermost position, the bottom of said pipe having a vent opening therein adjacent the bottom of said bait bucket.

In testimony whereof I have signed my name to this specification on this 12th day of August, A. D. 1922.

WILLIAM J. RUFF.